No. 702,658. Patented June 17, 1902.
B. G. LAMME.
DYNAMO ELECTRIC GENERATOR.
(Application filed Sept. 24, 1901.)
(No Model.) 3 Sheets—Sheet 1.

No. 702,658.  
B. G. LAMME.  
DYNAMO ELECTRIC GENERATOR.  
(Application filed Sept. 24, 1901.)

Patented June 17, 1902.

(No Model.)

3 Sheets—Sheet 2.

WITNESSES:  
Birney Hines  
J. C. Morse

INVENTOR  
Benjamin G. Lamme  
BY Kerley G. Carr  
ATTORNEY.

No. 702,658. Patented June 17, 1902.
B. G. LAMME.
DYNAMO ELECTRIC GENERATOR.
(Application filed Sept. 24, 1901.)
(No Model.) 3 Sheets—Sheet 3.
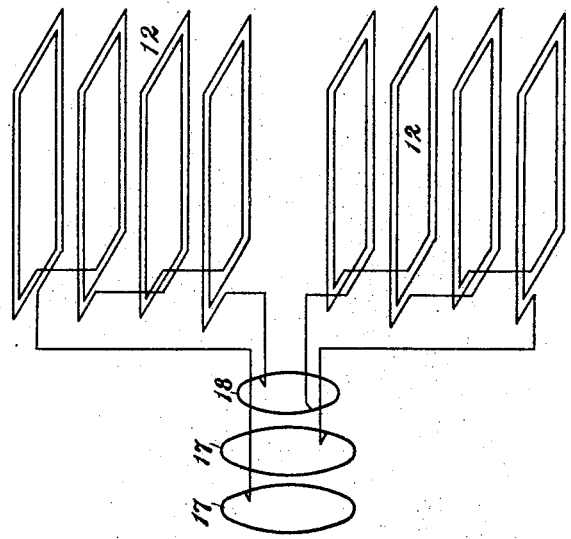
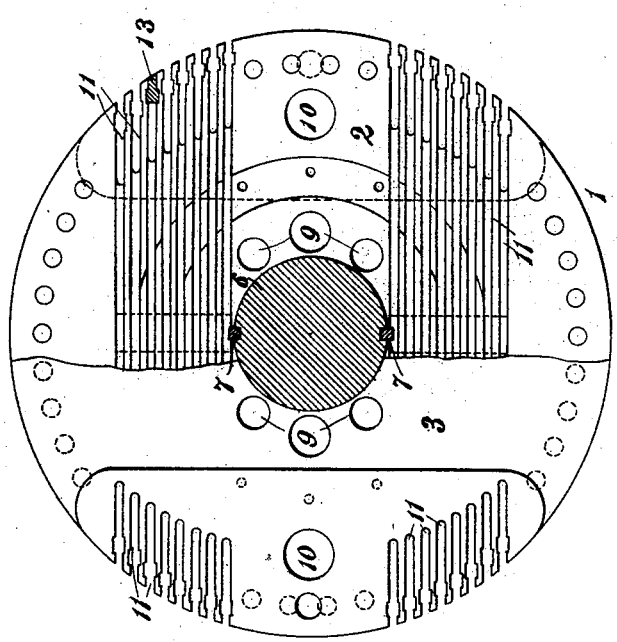
WITNESSES:
C. L. Belcher
Birney Hines
INVENTOR
Benjamin G. Lamme
BY Keeley G. Carr
ATTORNEY.

UNITED STATES PATENT OFFICE.

BENJAMIN G. LAMME, OF PITTSBURG, PENNSYLVANIA, ASSIGNOR TO WESTINGHOUSE ELECTRIC & MANUFACTURING COMPANY, A CORPORATION OF PENNSYLVANIA.

DYNAMO-ELECTRIC GENERATOR.

SPECIFICATION forming part of Letters Patent No. 702,658, dated June 17, 1902.

Application filed September 24, 1901. Serial No. 76,370. (No model.)

*To all whom it may concern:*

Be it known that I, BENJAMIN G. LAMME, a citizen of the United States, residing at Pittsburg, in the county of Allegheny and State of Pennsylvania, have invented new and useful Improvements in Dynamo-Electric Generators, of which the following is a specification.

My invention relates to dynamo-electric machines employed for generating electrical energy, and has more particular reference to machines employed for generating alternating-current energy.

The object of my invention is to provide the rotating member of a generator of the character above indicated which shall be simple and compact in construction, perfectly balanced, and especially well adapted for rotation at high speeds.

With these ends in view I have devised the apparatus shown in the accompanying drawings, in which—

Figure 1:
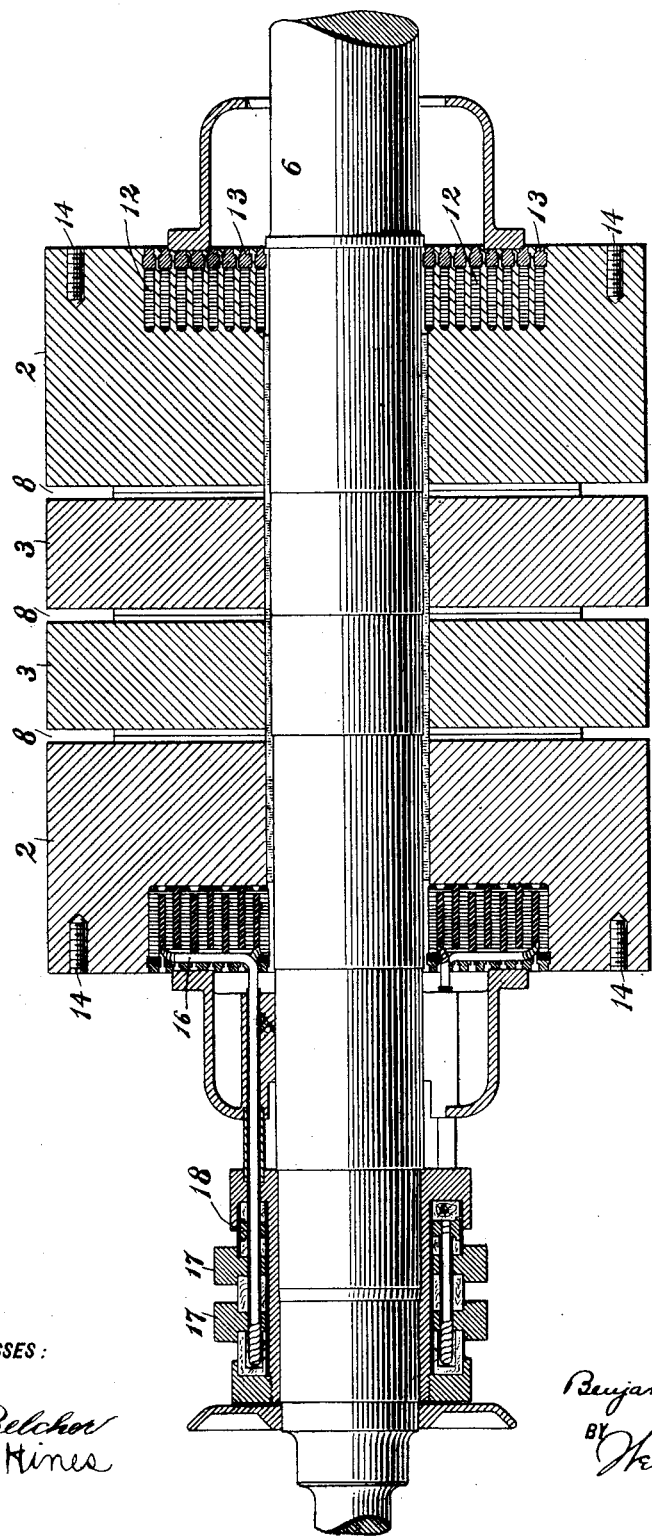
Figure 2:
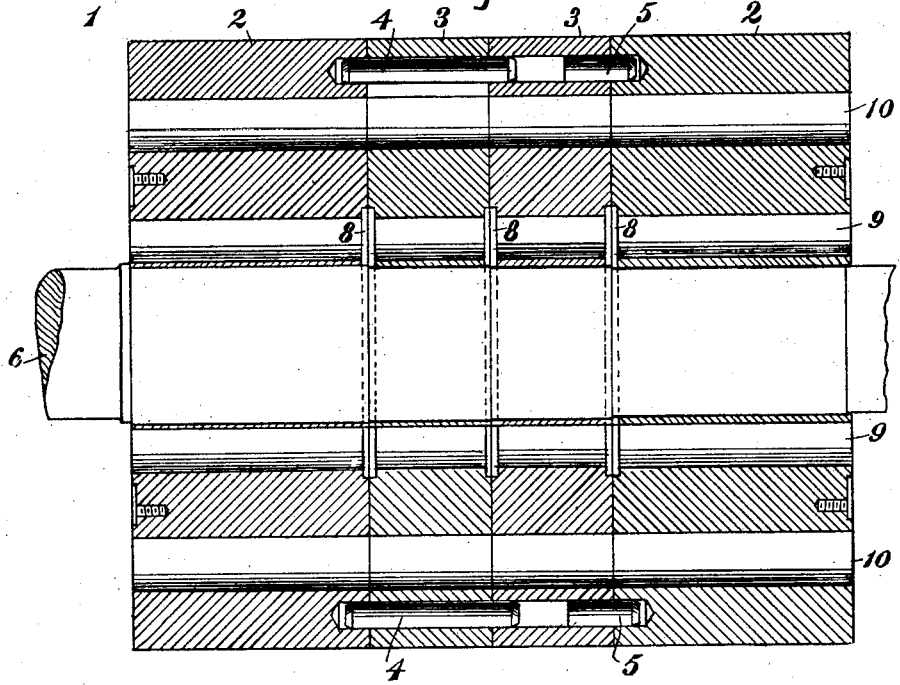
Figure 3:
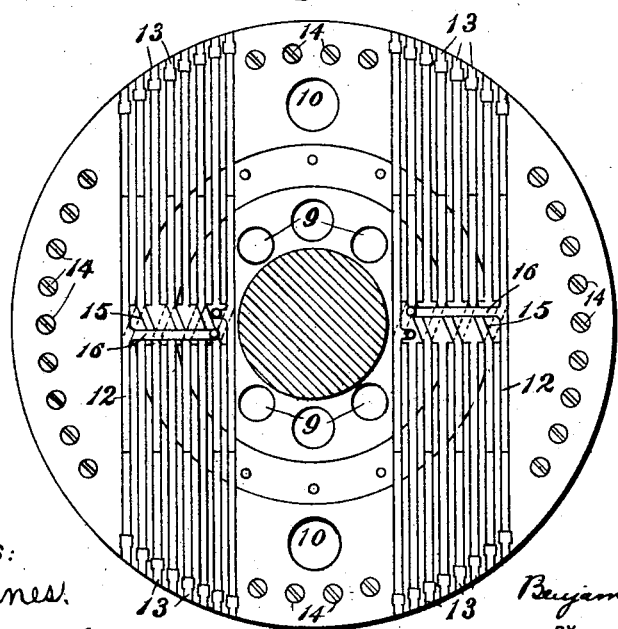

Figure 1 is a sectional view of the rotating member of an electric generator constructed in accordance with my invention, the ends of the shaft being broken away. Fig. 2 is a central longitudinal section of the core. Fig. 3 is an end elevation of the core, the shaft being shown in section. Fig. 4 is an end elevation of the core, the shaft being in section and a portion of the outer core-section being broken away. Fig. 5 is a diagram of the electric circuits of the members shown in Fig. 1.

As primarily designed and as shown in the drawings, the rotating member embodying my invention is a field-magnet, the stationary armature which coöperates therewith being omitted from the drawings, since it embodies no features of novelty. While the invention is not necessarily limited to field-magnet construction, yet the structure as shown is especially intended for such high-speed operation as would in most cases make it undesirable as armature construction.

In rotating members of dynamo-electric generators that are to be operated at high speeds—such, for example, as generators which are directly connected to steam-turbines—it is necessary to have the cores of the rotating members perfectly balanced and well ventilated and also to have the windings so constructed and arranged that the centrifugal force due to high speed shall not destroy or injure the insulation or displace the turns of the winding. A special construction of the core and windings is also necessary or desirable in order to avoid the noise and air resistance which would result from the rapid rotation of such members if constructed in accordance with the usual practice.

With these ends in view I have devised the means shown in the accompanying drawings, in which the core 1 is shown as comprising two end blocks or plates 2 of substantially the same form and dimensions and two intervening blocks or plates 3 of less thickness. The number and thickness of these parts may obviously be varied from what is shown, if desired. The several sections of the core are fastened together against independent circumferential movement by means of dowel-pins 4 and 5. As shown, two long dowel-pins 4 are provided and two shorter pins 5, the pins 4 being of such length as to project entirely through one of the plates or blocks 3 into the adjacent plate or block 2, while the shorter pins 5 project only into one of the blocks 2 and the adjacent block or plate 3. The shaft 6 has as many different diameters as there are sections of the core, as indicated, in order that the several sections may be pressed firmly and rigidly thereon. The sections of the core may also be fastened to the shaft by means of keys 7, as indicated in Fig. 4. Adjacent faces of the blocks or plates 2 and 3 are cut away or recessed to form ventilating-spaces 8, which extend completely through the core from side to side and communicate with longitudinally-bored holes 9, that are located at suitable intervals adjacent to the shaft. Ventilating-holes 10 are also provided, which extend completely through the core near the periphery. The core is provided with two sets of narrow and deep slots 11, one at each side of the shaft, which extend completely around the same. In these slots are wound the coils 12, here shown as in the form of strap-copper, though they may be formed of wire, if desired; but whatever the form in cross-section the conductor is of such dimensions relative to the width of the slots that there is only one turn in each layer and all of the turns are completely embedded in the core. The coils are held in position rigidly in the slots by means of non-magnetic metal wedges 13, that are turned down flush with the surface of the core after they are inserted in position. Each section of the core is exactly balanced independently as it is placed in position on the shaft, and the entire core is also balanced by means of screws 14, inserted in the ends, the number and location of these screws of course being regulated to secure the adjustment desired. As indicated in Fig. 3, the coils are severally connected to the adjacent coils in the set, so that all may be in series, through diagonal slots 15 in one end of the core. As indicated in Fig. 1, the wedges 13 are cut away at one end at suitable points to permit of the bringing out of the leads 16 from the coils to the collector-rings 17, on which the brushes (not shown) bear for supplying energizing-current to the coils. The small ring 18 (shown in Fig. 1 and indicated diagrammatically in Fig. 5) is employed solely for connecting the two portions of the winding at the two sides of the shaft, and it therefore is not provided with brushes.

Instead of employing the relatively thick plates shown the core might be built up of comparatively thin plates; but since it is necessary in high-speed operation to have the members perfectly balanced and as compact and indestructible as possible it will generally be found preferable to make the core of comparatively thick plates. The only object in providing thin plates would be the avoidance of too high temperatures; but since the windings employed in this connection are supplied with exciting-current only the means for ventilation shown will be sufficient to keep the temperature down within safe limits even with the comparatively thick plates shown.

It will be seen from the foregoing description, in connection with the illustration, that a rotating member constructed in accordance with my invention constitutes a practically unbroken cylinder except for the ventilating-openings, and that consequently there will be comparatively no atmospheric resistance, and therefore very little noise incident to the operation.

Variations from what is specifically shown and described as regards both form and dimensions may be made without departing from the spirit and scope of my invention.

I claim as my invention—

1. In an electrical machine, a rotatable member comprising a core and an insulated winding completely embedded therein.

2. In an electrical machine, a rotatable member comprising a cylindrical core and an insulated winding completely embedded therein.

3. In an electrical machine, a rotatable member comprising a cylindrical, sectional core and an insulated winding completely embedded therein.

4. In an electrical machine, a rotatable member comprising a slotted core formed of cylindrical sections fastened together by dowel-pins and an insulated winding located in the core-slots and beneath the core-surface.

5. In an electrical machine, a rotatable member comprising a cylindrical core having communicating longitudinal and transverse ventilating-passages and an insulated winding completely embedded in the core.

6. In an electrical machine, a rotatable member comprising a core having deep, narrow slots extending entirely around it and an insulated winding each turn of which occupies the entire width of a slot.

7. In an electrical machine, a rotatable member comprising a core having slots extending entirely around it and an insulated winding completely inclosed in said slots each turn of which occupies the width of its slot.

8. In an electrical machine, a rotatable member comprising a cylindrical core having a plurality of slots extending completely around it in planes parallel to the shaft and an insulated winding completely inclosed in said slots and having no side-by-side turns in any slot.

9. In an electrical machine, a rotatable member comprising a core formed of cylindrical sections of different internal diameters, an insulated winding completely embedded in said core and a shaft having a plurality of diameters corresponding to the internal diameters of the core-sections.

10. In an electrical machine, a rotatable member comprising a cylindrical core having a set of endless slots disposed in longitudinal planes, an insulated winding located in said slots and non-magnetic strips locked in the outer portions of the slots and flush with the surface of the core.

11. In an electrical machine, a rotatable member comprising a core formed of cylindrical sections and having a set of endless slots disposed in longitudinal planes, an insulated winding located in said slots and non-magnetic metal locking-strips in the outer portions of said slots and flush with the surface of the core.

In testimony whereof I have hereunto subscribed my name this 18th day of September, 1901.

BENJ. G. LAMME.

Witnesses:
JAMES B. YOUNG,
WESLEY G. CARR.